United States Patent [19]
Gestner et al.

[11] Patent Number: 6,153,668
[45] Date of Patent: *Nov. 28, 2000

[54] LOW DENSITY FIRE BARRIER MATERIAL AND METHOD OF MAKING

[75] Inventors: Robert E. Gestner, West St. Paul, Minn.; D. Max Harshbarger, Hudson, Wis.

[73] Assignee: 3M Innovative Properties Company, St. Paul, Minn.

[ * ] Notice: This patent is subject to a terminal disclaimer.

[21] Appl. No.: 09/016,879

[22] Filed: Jan. 30, 1998

[51] Int. Cl.[7] .............................. C09K 21/00; B27N 9/00
[52] U.S. Cl. ............................................ 523/179; 428/921
[58] Field of Search .............................. 523/179; 428/921

[56] References Cited

U.S. PATENT DOCUMENTS

| | | | |
|---|---|---|---|
| 4,302,344 | 11/1981 | Ruff et al. | 252/62 |
| 4,320,202 | 3/1982 | Yamamoto et al. | 501/80 |
| 4,375,516 | 3/1983 | Barrall | 501/84 |
| 4,443,517 | 4/1984 | Shah | 428/281 |
| 4,447,560 | 5/1984 | Piersol | 521/68 |
| 4,454,190 | 6/1984 | Katagiri | 428/281 |
| 4,463,039 | 7/1984 | O'Connell et al. | 427/421 |
| 4,588,523 | 5/1986 | Tashlick et al. | 252/606 |
| 4,613,627 | 9/1986 | Sherman et al. | 521/68 |
| 4,879,320 | 11/1989 | Hastings | 523/179 |
| 4,945,015 | 7/1990 | Milner et al. | 523/179 |
| 4,952,615 | 8/1990 | Welna | 523/179 |
| 5,057,166 | 10/1991 | Young, Sr. | 156/62.2 |
| 5,064,689 | 11/1991 | Young, Sr. | 427/202 |
| 5,232,976 | 8/1993 | Horacek et al. | 524/495 |
| 5,308,692 | 5/1994 | Kennedy et al. | 428/290 |
| 5,314,530 | 5/1994 | Wierer et al. | 106/2 |
| 5,384,188 | 1/1995 | Lebold et al. | 428/283 |
| 5,401,588 | 3/1995 | Garvey et al. | 428/703 |
| 5,434,200 | 7/1995 | Kolker et al. | 524/35 |
| 5,443,894 | 8/1995 | Pollock et al. | 428/213 |
| 5,453,119 | 9/1995 | Helmstetter | 106/18.12 |
| 5,830,319 | 11/1998 | Landin | 162/159 |

FOREIGN PATENT DOCUMENTS

| | | | |
|---|---|---|---|
| 0 164 555 | 3/1985 | European Pat. Off. | |
| 0 508 751 A2 | 10/1992 | European Pat. Off. | |
| 0 568 354 A1 | 4/1993 | European Pat. Off. | C09D 5/18 |
| 32 06 218 A1 | 9/1996 | Germany | |
| 2 271 362 | 4/1994 | United Kingdom | D21H 21/00 |
| 2 273 100 | 6/1994 | United Kingdom | |
| 2 254 609 | 7/1994 | United Kingdom | |
| WO 90/11170 | 10/1990 | WIPO | |
| WO 94/11462 | 5/1994 | WIPO | |
| WO 97/13823 | 4/1997 | WIPO | C09K 21/14 |

*Primary Examiner*—James J. Seidleck
*Assistant Examiner*—Olga Asinovsky
*Attorney, Agent, or Firm*—David B. Patchett

[57] ABSTRACT

This invention relates to a fire barrier material comprising at least about 25 weight % binder; at least about 10 weight % intumescent compound; and at least about 5 weight % organic fibers comprising an organic material having pendant hydroxyl groups, wherein the density of the fire barrier material ranges from greater than zero to about 0.35 grams/cm$^3$ as well as a method of making the fire barrier material.

29 Claims, No Drawings

LOW DENSITY FIRE BARRIER MATERIAL AND METHOD OF MAKING

FIELD OF THE INVENTION

This invention relates to a fire barrier material that deters the spread of flames, smoke, vapors, and/or heat during a fire.

BACKGROUND OF THE INVENTION

Fire barrier materials (often referred to as firestop materials or fire retardant materials) are used to reduce or eliminate the passage of smoke and flames through openings between walls and floors and the openings caused by through-penetrations (i.e., an opening in a floor or wall which passes all the way through from one room to another) in buildings, such as the voids left by burning or melting cable insulation resulting from fire in a modern office building. Characteristics of fire barrier materials suitable for typical commercial use include flexibility prior to exposure to heat, the ability to insulate and/or expand, and the ability to harden in place upon exposure to fire, i.e. to char sufficiently to deter the passage of heat, smoke, flames, and/or vapors. Although many such materials are available, the industry has long sought better and more effective materials. For example, many commercially available materials protect for only limited periods of time because of poor stability at elevated temperatures. Additionally, these materials do not provide good mechanical strength under high-pressure water sprays as required by ASTM E-814-88, "Standard Test Method For Fire Tests Of Through-Penetration Fire Stops".

Foams, caulks, and putty-like materials are known for use in various fire barrier applications. For example, urea-formaldehyde resin foams are known to be useful for filling gaps between concrete floor slabs and upright curtain walls. Such foams typically require some form of support (e.g., a thin sheet of metal) because the mechanical strength of foams is typically relatively low, and that of a charred foam (i.e., after exposure to a fire) generally is even lower. Intumescent compounds (e.g., expandable graphite and hydrated alkali metal silicate granules incorporating an oxyboron compound) have been used with polymeric binders to form caulks for use in filling narrow (e.g., less than about 2.5 cm) joints or small holes. Such materials can also include crosslinking and/or fire retardant compounds (e.g., phosphates), thickeners (e.g., cellulose), and fillers (e.g., inorganic fibers, cellulosic fibers, and polymeric fibers). These compositions, however, are typically flowable and, therefore, generally not capable of maintaining their shape prior to being charred without some type of support. That is, most of these compositions are generally not self-supporting.

Self-supporting fire barrier materials are known. For example, elastomeric sheets containing intumescent compounds are known for use in pipe wraps or cable tray wraps. Also, rigid boards containing polymeric foams in combination with alkali metal silicates are known for use as thermal insulating covers on surfaces such as walls, ceilings, doors, and the like. These rigid foam boards typically are coated with a protective layer to render them moisture resistant. Intumescent ceramic insulating fiber felts or mats are also known; if such felts are used in a space which is not enclosed, such as a curtainwall or a wall penetration, they will often crumble and fall out when heated and expanded.

One approach to answering this need for a self-supporting fire barrier material is described in WO 97/13823 (Landin et al.) wherein a flexible fire barrier felt is formed from an organic polymeric binder, organic fibers having pendant hydroxyl groups, a heat absorbing compound and a phosphorus-containing compound. This material is self-supporting and forms a self-supporting char if exposed to heat and/or flame.

There is still a need in the art, however, for fire barrier materials that are self-supporting and form strong, self-supporting chars upon exposure to heat, which are easy to install, and which are even more economical to produce.

SUMMARY OF THE INVENTION

This invention is directed to a low density fire barrier material having excellent performance characteristics during a fire.

In this application, the following terms refer to the definitions provided.

"Binder" refers to an organic polymeric material.

"Cellulosic fibers" refers to fibers of carbohydrate polymers typically derived from natural materials such as wood or cotton and are a species of organic fibers.

"Char" is a carbonaceous residue formed upon heating the fire barrier material to a temperature of greater than about 250° C., as would be experienced when exposed to flames.

"Char strength" is a measure of the ability of the carbonaceous residue ("char") to remain intact as measured by the hose stream portion of ASTM E-814, "Standard Test Method For Fire Tests Of Through-Penetration Fire Stops".

"Intumescent compound" refers to a compound that provides for expansion of the composition in which it is present of at least about 1.5 times the original volume of the composition upon heating at a temperature, typically above about 100° C.

"Organic fibers" refer to natural or synthetic polymeric materials having pendant hydroxyl groups, which are in the form of fibers.

One aspect of the present invention is directed to a fire barrier material comprising at least about 25 weight % binder; at least about 10 weight % intumescent compound; and at least about 5 weight % organic fibers comprising an organic material having pendant hydroxyl groups, based on a total dry weight of the fire barrier material; wherein the density of the fire barrier material ranges from greater than zero to about 0.35 grams/cm$^3$.

In another aspect of the invention, a fire barrier material comprises about 25–80 weight % binder; about 10–60 weight % intumescent compound; and about 5–60 weight % organic fibers comprising an organic material having pendant hydroxyl groups, based on a total dry weight of the fire barrier material; wherein the density of the fire barrier material ranges from greater than zero to about 0.35 grams/cm$^3$.

The invention is also directed to a method of making a fire barrier material comprising the steps of (a) providing components comprising at least about 25 weight % binder, at least about 10 weight % intumescent compound, and at least about 5 weight % organic fibers comprising an organic material having pendant hydroxyl groups, based on a total dry weight of the fire barrier material; (b) combining the components to form a mixture; (c) foaming the mixture; (d) placing the foamed mixture onto a substrate; and (e) drying the foamed mixture for a time sufficient to form the fire barrier material, wherein the fire barrier material has a density ranging from greater than zero to about 0.35 g/cm$^3$.

DETAILED DESCRIPTION OF THE INVENTION

This invention provides a fire barrier material having a low density, typically ranging from greater than zero to about 0.35 g/cm$^3$. The material is similar in appearance to a sponge or a foam, and may referred to hereinafter as "foam-like" or "sponge-like". The fire barrier material of the present invention is porous with many variously-sized voids. One way to achieve a low density fire barrier material of the present invention is by incorporating a gas, for example, air, into a mixture of the components used to form the fire barrier material.

Preferably, the fire barrier material of the present invention is compressible, which means that it can be shaped and compressed using hand pressure. Further, the material preferably is sufficiently elastic to recover from compression, i.e., return to essentially its original shape and/or thickness after having been compressed.

Typically, a fire barrier material of the present invention will require a pressure ranging from 30.0 KPa (4.35 psi) to about 340 KPa (49.3 psi), preferably from 35 KPa (5.1 psi) to 200 KPa (29.0 psi), to compress the material to 50% of its starting thickness and has a recovery of 90% of its starting thickness in less than about 3 minutes, preferably less than or equal to 2 minutes.

A fire barrier material of the present invention can be formed into a variety of shapes, such as a mat, pad, or sheet, rod, or a complex shape such as a cup or clamshell. The material can be any thickness, depending upon the desired use, but typically ranges from about 1.2 cm to about 5 cm (about 0.50 to about 2.0 inches). During a fire, the fire barrier material forms a self-supporting char that has sufficient integrity to effectively seal an opening against the passage of heat, smoke, flames, and/or vapors. It also may insulate against the transfer of heat, both before and after forming a char.

The fire barrier material of the present invention comprises a binder, organic fibers comprising an organic material having pendant hydroxyl groups, and an intumescent compound.

Binder

The binder serves to hold the organic fibers, intumescent compound, and any optional ingredients together. Binders used in the present invention comprise a polymeric material and may be in the form of aqueous emulsions (also referred to as "latices"), aqueous solutions, non-aqueous solutions, or organosols. The term "solution" refers to polymeric materials dissolved in a liquid media, such as water or an organic liquid such as acetone or toluene. Suitable binders may include polymer materials which may be either thermoplastic or thermosetting.

"Thermoplastic" materials typically have long polymer chains with few, if any, chemical bonds acting to crosslink the chains. Thermoplastic materials, when heated, normally become soft and moldable and return to their original condition when cooled. Subsequent reheating serves to resoften the material. Examples of thermoplastic materials include substantially linear polymers such as acrylate polymers, natural rubbers, polychloroprene, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, and combinations and mixtures of these polymers. The term "substantially linear" as used with reference to these materials refers to a preference for no more than three or four branches on average per polymer chain, preferably one or two, and most preferably zero.

"Thermoset" materials refer to polymers which undergo crosslinking reactions and thus cure or "set", typically upon heating. If the crosslining is sufficiently high, the material tends to be hard, infusible, and insoluble. Such materials typically cannot be subsequently permanently changed if warmed. Two or more liquid components can be reacted to form a thermoset polymers; for example, a multifunctional amine and a multifunctional epoxy may be reacted to form an epoxy system. Examples of suitable thermoset materials include epoxies, polyurethanes, polyimides and the like. In addition, suitable thermoset materials include thermoplastic materials capable of being crosslinked with the addition of a crosslinking agent, for example, polychloroprene, styrene butadiene copolymers, butadiene acrylonitrile copolymers, and polybutadiene.

The amount of binder used is that sufficient to hold the components of the fire barrier material together. The amount of binder generally is at least about 25 weight %, based on a total dry weight of the fire barrier material, and preferably ranges from about 25 weight % to about 80 weight %, more preferably from about 35 weight % to about 60 weight %.

Preferably, the binder is selected to enhance both flame-retardance and char strength of the fire barrier material. Suitable latices include halogenated and non-halogenated latices. A suitable halogenated latex is polychloroprene latex.

Preferred latices are non-halogenated and include acrylate polymers, natural rubbers, styrene butadiene copolymers, butadiene acrylonitrile copolymers, polyisoprene, polybutadiene, as well as combinations and mixtures of these polymers. Examples include an acrylate polymer commercially available under the trade designation "RHOPLEX HA-8" from Rohm and Haas Company of Philadelphia, Pa.; an ethylene/vinyl acetate/acrylate terpolymer commercially available under the trade designations "AIRFLEX 600 BP" and "FLEXBOND 153" from Air Products and Chemicals, Inc. of Allentown, Pa.; and a vinyl acetate/dioctyl maleate copolymer, commercially available under the trade designation "FLEXBOND 149" also available from Air Products and Chemicals, Inc.

If the binder comprises a halogenated polymer and the halogen is present in sufficient quantity, the binder typically has flame retardant properties, and no additional flame retardant need be added to the mixture making up the fire barrier material. When the binder has no inherent flame retardant properties, a flame retardant preferably is added to the mixture of binder, organic fibers, and intumescent compound.

As known to those of skill in the art, many methods may be used to determine the flame retardancy of a material. A semiquantitative test method can be used to evaluate the ignitability and burning behavior of different polymers, i.e. the "limiting oxygen index". This test relatively measures flame retardancy by measuring the minimum concentration of oxygen in an oxygen-nitrogen atmosphere that is necessary to initiate and support a flame for $\geq 3$ minutes. The higher the ignitability, the higher the oxygen index. This test is described in ASTM standard D 2863, "Standard Test Method for Measuring the Minimum Oxygen Concentration to Support Candle-like Combustion of Plastics (Oxygen Index)". When the fire barrier material of this invention comprises binders having a limiting oxygen index of greater than about 25 (which generally include halogenated polymers), an additional flame retardant is generally not required.

When the binder does not have inherent flame retardant properties, it is desirable to add a flame retardant to the mixture of binder, intumescent, and organic fibers. Exemplary flame retardants compounds include phosphorous-containing compounds (e.g., ethylene diamine phosphate, magnesium ammonium phosphate, polymer-encapsulated ammonium polyphosphate, and organic phosphate oils), boron-containing compounds, alumina trihydrate, antimony oxide, and other metal oxides and hydrates. Exemplary flame etardant materials also include glass frit, as disclosed for example, in U.S. Pat. No. 4,879,066, incorporated herein by reference. Exemplary glass frit includes glass frit commercially available from CEEPREE Products Ltd., Southport, Merseyside, England, under the trade designation "Ceepree 200". Various mixtures and combinations of these materials may be used. Preferred flame retardants include ethylene diamine phosphate commercially available commercially available as "AMGARD NK" from Albright and Wilson Americas, Inc. of Richmond, Va.

Flame retardants are typically used in an amount sufficient to impart flame retardancy to the fire barrier material. Typically, about 5 to about 200 parts of a flame retardant are used for 100 parts of binder. If the binder is a latex, the amount of flame retardant is based on solids content and typically is used in an amount ranging from about 5 to about 200 parts per 100 parts of latex solids.

Organic Fibers

Organic fibers suitable for use in this invention are those comprising an organic material having pendant hydroxyl groups. Examples of organic fibers include naturally-occurring cellulosic fibers and synthetic polymeric fibers.

Suitable naturally-occurring cellulosic fibers include cotton, flax, hemp, jute, rice, wheat, bamboo, corn, sisal, ramie, kenaf, rayon, burlap, shoddy cotton, cotton linters, and pulp fibers. Preferred cellulosic fibers include wood fibers. Wood pulp fibers can be obtained from well known chemical processes such as the kraft and sulfite processes as well as from mechanical pulp processes. Suitable starting materials for these processes include hardwood and softwood species, such as alder, pine, Douglas fir, spruce, and hemlock. Preferred wood fibers are commercially available from Conwed Fibers of Conover, N.C., and comprise pine and poplar fibers.

Suitable synthetic polymeric fibers include viscose rayon, cellulose diacetate, and cellulose triacetate.

Preferably, individual fibers are used. The term "individual fibers" refers to fibers that are comprised of individual, separated fibers. While fibers may be available in bundles due to their manufacturing process, it is preferred for the present invention to separate the fibers before mixing them with the binder and other components of the fire barrier material. If fiber bundles are used to supply individual fibers, preferably only a small amount of fiber bundles remain in the fiber provided for use. "A small amount" typically refers to less than 5 weight %, preferably less than 1 weight %, based on the total weight of fibers used. Fiber bundles may be separated by agitating the fiber bundles, for example, in a blender or a planetary blade mixer.

Suitable fibers preferably include "discontinuous" fibers. The term "discontinuous" refers to fibers of a relatively short length in comparison to continuous fibers formed by an extrusion processes. For the purpose of the present invention, discontinuous fibers can include individual fibers and fiber bundles. Exemplary discontinuous fibers typically range in length from about 0.2 cm to about 2.5 cm (about 0.1 to 1 inch), preferably from about 0.64 cm to about 1.9 cm (about 0.25 to 0.75 inch).

The fiber is generally present in an amount ranging from at least about 5 weight %, based on a total dry weight of the fire barrier material, typically from about 5 weight % to about 60 weight %, preferably from about 10 weight % to about 30 weight %.

Intumescent Compound

The fire barrier material of this invention comprises an intumescent compound. An intumescent compound is one that expands to at least about 1.5 times its original volume upon heating to a temperature greater than its intumescence activation temperature.

Suitable intumescent compounds include intercalated graphite, hydrated alkali metal silicates, vermiculite, perlite, mica, and mixtures thereof Preferred intumescent compounds include an acid intercalated graphite having an acid-neutralized surface commercially available under the trade designation "GRAFGUARD", from UCAR Carbon of Cleveland, Ohio and a granular hydrated alkali metal silicate intumescent composition commercially available under the trade designation "EXPANTROL 4BW" from Minnesota Mining and Manufacturing Company (3M) of St. Paul, Minn.

The intumescent compound is present at least in an amount sufficient to prevent the low density fire barrier material from shrinking when it is heated and may be used in an amount to produce expansion up to about 5 times, in some instances up to nine times, the original volume of fire barrier material when it is exposed to a fire. The intumescent compound is generally present in an amount of at least about 10 weight %, based on a total dry weight of the fire barrier material, typically from about 10 weight % to about 60 weight %, and preferably from about 20 weight % to about 40 weight %.

Optional Additives

Optional additives may be included to add or enhance properties of the fire barrier material and may include fillers, endothermic compounds, pigments, and colorants.

Fillers may be included to add reinforcement, adjust the stiffness, alter the handleability, or produce other desirable characteristics of the fire barrier material either before or after exposure to heat and flame. Exemplary fillers include finned silica, clay, fly ash, perlite, vermiculite, glass powders or frits, sodium aluminates, zinc borate, boric oxide, inorganic fibers (e.g., glass fibers, glass ceramic fibers, ceramic fibers, mineral fibers, and carbon fibers), and organic fibers (e.g., thermoplastic fibers such as nylon fibers and polyester fibers). Some of these refractory materials (i.e., oxides, borates, and glass and ceramic materials) may contribute to the fire retardancy of the fire barrier material; such are preferred fillers. If a halogenated organic polymeric material is used as a binder, oxide is typically added to scavenge HCl, which may be given off when the fire barrier material is heated. While glass frit has been described above as a useful flame retardant, it may also be used as a filler.

Endothermic compounds may also be added to contribute to the flame retardancy of the fire barrier material. An endothermic compound is one that absorbs heat typically by releasing water of hydration. These compounds include magnesium ammonium phosphate, magnesium hydroxide hydrate, and calcium sulfate hydrate (also known as gypsum). Preferred endothermic compounds are essentially insoluble in water and include alumina trihydrate ($Al_2O_3.3H_2O$) and hydrated zinc borate, for example, $2ZnO.3B_2O_3.3.5H_2O$, which is commercially available from U.S Borax, Los Angeles, Calif. under the trade designation "Firebrake ZB".

Pigments may be useful as an identification aid for the product. Exemplary pigments and colorants include iron oxides, titanium dioxide (e.g., rutile), carbon black, and synthetic organic pigments and dyes (e.g., FD&C Blue #1).

Additional optional additives include synthetic sponge material. In a preferred embodiment, the fire barrier material of this invention further comprises synthetic sponge, also referred to as cellulose sponge. The sponge may be ground, or particulated, to a desired size, typically ranging in the largest dimension from about 0.32 to about 1.2 cm, nd added to the mixture of binder, fiber, and intumescent compound. The amount of ponge added to the mixture typically ranges from about 1 weight % to about 20 weight %, based on a total dry weight of the fire barrier material, and preferably ranges from about 4 weight % to about 10 weight %. The presence of sponge contributes further to the low density of the fire barrier material and assists in maintaining a desired shape during drying of the mixture. It also allows the material to be dried in sheet form without the use of a mold or container. Fire barrier material containing sponge generally has a firmer compression.

Commercially available synthetic sponge typically comprises viscose cellulose, and may also contain reinforcing fibers. The viscose cellulose can be made from any conventional viscose technique. The viscose cellulose is commonly prepared through the mercerization and shredding of wood pulp, followed by xanthation with carbon disulfide, dilution with water, and finally, mixing the mixture. After the viscose cellulose is made, crystals of sodium sulfate decahydrate, referred to as Glauber's Salt, are added to the viscose cellulose. Reinforcing fibers or other additives are then added. The resulting mixture is heated to about 100° C., causing the cellulose to coagulate while melting the sodium sulfate. The sodium sulfate is rinsed from the resultant regenerated sponge leaving a porous structure.

A suitable synthetic sponges is commercially available under the trade designation "O-CEL-O" from Minnesota Mining and Manufacturing Company (3M) of St. Paul, Minn.

Method of Making a Fire Barrier Material

The method of the present invention comprises the steps of (a) providing components comprising at least about 25 weight % binder, at least about 10 weight % intumescent compound, and at least about 5 weight % organic fibers comprising an organic material having pendant hydroxyl groups, based on a total dry weight of the fire barrier material; (b) combining the components to form a mixture; (c) foaming the mixture; (d) placing the foamed mixture onto a substrate; and (e) drying the foamed mixture for a time sufficient to form the fire barrier material, wherein the fire barrier material has a density ranging from greater than zero to about 0.35 g/cm$^3$.

The components of the fire barrier material are combined by mixing or stirring for a time sufficient to obtain a homogeneous mixture. Typically and preferably, this is done at low speed on a mixer such as a planetary blade mixer (commercially available from Hobart Company of Troy, Ohio). After the components are combined, the mixture is foamed, typically by incorporating a gas, for example, air, into the mixture to produce a foam-like material. "Foam-like" refers to the appearance of the material; the mixture has the texture and appearance of light whipped cream. The foamed material generally has a sufficient low shear viscosity to maintain the foamed state through the drying step.

Methods to incorporate a gas include mixing, shearing, and shaking ingredients together, bubbling air through the mixture, or adding a blowing agent such as melamine resin, urea, or dicyandiamide and combinations thereof. Blowing agents are materials that, when heated, give off gases (such as nitrogen, hydrogen, and carbon dioxide) that contribute to the foam-like nature of the mixture of binder, fiber, intumescent material, optional fillers and optional sponge. Incorporation of a gas is preferably performed by incorporating air by high speed mixing, such as in a planetary blade mixer (or the like), or with shear in a blender. While the steps of combining and incorporating a gas can occur concurrently, a gas, for example, air is preferably incorporated into the mixture after the combining step.

Preferably, surfactants, thickeners, film formers, and other ingredients are present to assist in forming and stabilizing the foam-like material. Surfactants, also referred to as surface active agents, are thought to assist in stabilizing the foam-like structure produced upon the incorporation of gas, for example, air, into the mixture. Preferred surfactants include N-tallow sulfo succinimate, commercially available under the trade designation "STANFAX 318" and ammonium stearate, commercially available under the trade designation "STANFAX 320", both from Standard Adhesive & Chemical Company, Inc. of Dalton, Ga.

Thickeners, or thickening agents, are added to increase the viscosity of the mixture and also are thought to assist in stabilizing the foam-like structure. Thickeners include fumed silica, cellulose powder, and polymer emulsions. Preferred thickeners include pendant acid-containing acrylic emulsion copolymers commercially available under the trade designations "ACRYSOL ASE Series" from Rohm and Haas Company of Philadelphia, Pa. When acrylic emulsion copolymers are used, a base, preferably sodium hydroxide, is added to the mixture to raise the pH to about 8.

Stabilizing the foam-like mixture is preferred and particularly desirable when the mixture is prepared and stored for a time (e.g., hours) before applying to a substrate.

Once the mixture has been formed into a foam-like material, it is placed or applied onto a substrate, for example, by casting, pouring, or spreading. Placing or applying the mixture onto a substrate can be accomplished by casting the mixture onto a substrate and then pressing it to a desired thickness by means of a platen press, or it can be poured or cast into a mold lined with a release liner.

The substrate may include a mold or a release liner or a combination of both. A preferred substrate is a silicone coated release liner.

The mixture is then dried at temperatures ranging from about 50° C. to about 175° C. for a time sufficient to remove any excess water (not water of hydration) or other liquid medium. Drying time and temperatures are dependent on total water or liquid medium content and vary with the thickness and density of the fire barrier material. Typically the fire barrier material is formed by drying the mixture in an oven. The fire barrier material can then be released from the substrate after it has been dried and used in its released form. The temperature of the article during drying should be maintained below the temperature at which the intumescent compound will be activated and below the dehydration temperature of any hydrate used in the material.

In addition, the fire barrier material may be applied to a material such as a substrate. For example, it may be desirable to laminate the fire barrier material to another material, since lamination may serve to control the direction of expansion of the fire barrier material. Exemplary materials include a restraining layer such as a metal foil (e.g., aluminum or steel foil), graphite foil, an insulating blanket, or other fire barrier sheets. Other materials useful as restraining layers are described in U.S. Pat. No. 4,467,577 (Licht), and include a metal screen, paper, cardboard, and rubber or plastic sheets. Lamination can be done, for example, by pressing the fire barrier material of the present invention together with another material at room temperature or by running them through laminating rollers (which typically use pressure and heat). If another material is present to act as a substrate, lamination may occur as part of the drying step depending on the latex used in the fire barrier material. For example, a preferred latex, Airflex 600 BP, has enough tack that lamination to another material, if present, can occur during the drying step. It is preferable, however, to perform separate drying and lamination steps to reduce the length of the drying step. If necessary, an adhesive can be used to laminate two layers together.

An alternate method of making the present invention uses steps from a conventional paper-making process such as a handsheet former. The paper making process is well known to those skilled in the art, for example, as described in U.S. Pat. No. 5,384,188, incorporated herein by reference. This embodiment comprises the steps of (a) providing components comprising at least about 25 weight % latex binder, at least about 10 weight % intumescent compound, at least about 5 weight % organic fibers comprising an organic material having pendant hydroxyl groups, based on a total dry weight of the fire barrier material; (b) combining the components to form an aqueous slurry; (c) flocculating the aqueous slurry; (d) pouring the flocculated, aqueous slurry into a handsheet former having a forming box and forming screen, and draining the forming box; (e) removing the resultant wet mixture from the forming screen; and (f) drying the wet mixture for a time sufficient to form the fire barrier material, wherein the fire barrier material has a density ranging from greater than zero to about 0.35 g/cm$^3$.

The components of the fire barrier material in the alternate method are combined by mixing or stirring for a time sufficient to obtain a homogeneous aqueous slurry. Typically, this is done either using a propeller-blade stirrer in a beaker, or using a high speed blender (commercially available from Waring Corp. of New Hartford, Conn.) After the aqueous slurry is formed, the latex binder is precipitated, typically by adding a precipitating agent such as aluminum sulfate (alum). This causes flocculation of the aqueous slurry. Once the slurry has been flocculated, it is poured into a handsheet former (commercially available from Willams Apparatus Co., Watertown, N.Y.) containing a metal screen. The handsheet former is drained, causing the mixture to collect on top of the metal screen. The resultant wet mixture is then removed from the screen and placed on a substrate such as blotter paper. The mixture can be optionally pressed using a roller to help in the water removal.

The mixture is then dried at temperatures ranging from about 50° C. to about 175° C. for a time sufficient to remove any remaining water. Drying time and temperatures are dependent on total water content and vary with the thickness and density of the fire barrier material. Typically the fire barrier material is formed by drying the mixture in an oven. The temperature of the article during drying should be maintained below the temperature at which the intumescent compound will be activated and below the dehydration temperature of any hydrate used in the material. The fire barrier material may be applied to a material such as a substrate as described above.

After drying, the fire barrier material is ready for use. The resultant fire barrier material retains the foam-like nature of the mixture and is similar in appearance to a sponge (i.e., sponge-like), with many variously sized voids or cells. The material can be cut into any desired dimension or shape.

Methods of Using a Fire Barrier Material

The fire barrier material of this invention is useful in applications in which intumescent fire barrier mats or pads are commonly used. This includes sealing or isolating openings in building components, such as gaps between walls, cavities, interspaces, wall breaks, cable ducts, electrical cable trays, pipe wraps, through-penetrations, dynamic joints, and the like. It also may be useful as a heat insulation for roofs, walls, windows, and floors, a lining for metal panels and doors, or a backing for fire retarding walls.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods

Wet Density Test

A metal cup having a known volume was weighed. The cup was then filled with wet fire barrier material and the weight of wet fire barrier material was calculated by subtracting the weight of the cup from the combined weights of the cup and the wet fire barrier material. The density of the wet fire barrier material is the weight of wet fire barrier material contained by the cup divided by the known volume of the cup.

Dry Density Test

The fire barrier material was cut into a 2.5 cm square sample. The thickness of the sample was measured. The total volume was calculated and the sample was weighed. Density is the weight of the sample divided by the volume of the sample.

Volume Expansion Test

The volume of a 2.5 cm square sample was determined as described above for the Dry Density Test. The sample was then heated in an oven set at 350° C. for 15 minutes. This heat treatment caused intumescence and expansion of the sample. After the sample was cooled, it was dipped into melted wax to coat the sample with a wax thickness of about 0.25 to 0.50 mm (0.01 to 0.02 inches), then immersed in water. The volume of the sample was determined by water displacement. The volume expansion is reported as an expansion ratio, wherein the expansion ratio is the volume of the expanded sample divided by the volume of the initial sample.

Hose Stream Test

To test the strength of the char formed after the fire barrier material has been burned, a hose stream test was carried out according to ASTM E-814-88, "Standard Test Method For Fire Tests Of Through-Penetration Fire Stops".

A concrete slab (to simulate a concrete floor), 11.4 cm (4.5 inches) thick was prepared having a 14 cm (5.5 inch) diameter opening through which was placed a 10.5 cm (4.1 inch) diameter copper pipe. A length of the fire barrier material was compressed and placed in the annular space around the copper pipe.

The concrete slab (with the pipe and the fire barrier material) was placed over the top of a gas-fired furnace to simulate a floor having a fire beneath it. The furnace was heated for one hour according to the following temperature schedule:

| Time (minutes) | Temperature (° C.) |
|---|---|
| 0 | 24 |
| 5 | 538 |
| 10 | 704 |

-continued

| Time (minutes) | Temperature (° C.) |
| --- | --- |
| 30 | 843 |
| 60 | 927 |

After one hour of heating, the gas supply to the furnace was turned off and the concrete slab was removed from the furnace, positioned vertically, and subjected to a stream of water from a fire hose. An "F rating" of one hour indicates the char formed by the fire barrier material during exposure to a flame withstood the force of the water from the hose stream.

Compressibility and Thickness Recovery Test

Rectangular samples of fire barrier material of the present invention having a length dimension of 8.25 cm (3.25 in) by a width dimension of 5.08 cm (2.0 in) at a thickness ranging from about 2.0 cm (0.8 in) to about 3.43 cm (1.35 in) were placed in an MTS Tensile Testing Machine and compressed to 50% of the starting thickness, at a rate of 7.6 cm/min (3.0 in/min). The peak force needed to compress the sample was recorded. The sample was then released from compression and the thickness was measured as a function of time, with the time starting from the release of compression. The pressure needed to compress the sample was calculated as follows: peak force divided by the area exposed to compression (area=sample length×sample width). This value was designated as the "compression pressure". The time to achieve recovery of 90% of the starting thickness was designated as "90% recovery time".

Example 1

220 grams of deionized water, 364 grams of an ethylene/vinyl acetate/acrylate terpolymer (55% solids, commercially available under the trade designation "AIRFLEX 600 BP" from Air Products and Chemicals, Inc. of Allentown, Pa.), 50 grams of pine fibers (Pinemat Fiber, commercially available from Conwed Fibers of Conover, N.C.), 25 grams of ethylene diamine phosphate (commercially available as "AMGARD NK" from Albright and Wilson Americas, Inc. of Richmond, Va.), 100 grams of an acid intercalated graphite having an acid-neutralized surface (commercially available under the trade designation "GRAFGUARD", Grade 338, from UCAR Carbon of Cleveland, Ohio), 50 grams of moist sponge crumb (i.e., ground-up sponge, having an average size of about 0.6 cm) (having a dry weight of 26.4 grams, commercially available under the trade designation "O-CEL-O" from Minnesota Mining and Manufacturing Company (3M) of St. Paul, Minn.), 12 grams of N-tallow sulfo succinimate surfactant, (33% solids, commercially available under the trade designation "STANFAX 318") and 12 grams of ammonium stearate surfactant (33% solids, commercially available under the trade designation "STANFAX 320" both from Standard Adhesive & Chemical Company, Inc. of Dalton, Ga.), 11.11 grams of a pendant carboxyl-containing acrylic emulsion copolymer (18% solids) (commercially available under the trade designation "ACRYSOL ASE-95 NP" from Rohm and Haas of Philadelphia Pa.), and 10.5 grams of sodium hydroxide aqueous solution (50% solids) were placed into the bowl of a 3-speed, 3.78 liter (1 gallon), planetary blade mixer (commercially available as Model N-50 from Hobart Corp. of Troy, Ohio).

This mixture was stirred at low speed (speed #1) for about 5 minutes to get a homogeneous mixture. The fibers appeared to be uniformly dispersed. Then the mixer speed was increased (to medium speed, #2 setting) and the mixture was stirred in a manner which caused foaming and the incorporation of air. The final consistency (after about 15 minutes) was similar to that of whipped cream. The percent solids of the mixture was 48.75%. The wet density was 0.316 g/cm$^3$, according to the Wet Density Test, as described above.

The mixture was cast into a mold lined on the bottom with a silicone-coated paper release liner. The mold was an aluminum frame 17.8 cm wide×45.7 cm long×3.8 cm high. The mixture was smoothed over with a spatula so that it was even with the top of the frame. The frame was removed, and the release liner having the mixture on it was placed into an oven at 80° C. to dry for about 18 hours.

The thickness of the dried material was about 2.4 cm. The density measured according to the Dry Density Test was 0.21 grams/cm$^3$. The expansion ratio was 1.98.

A sample was tested according to the Compressibility and Thickness Recovery Test. The compression pressure was 123.2 KPa (17.8 psi) and the 90% recovery time was 90 seconds.

Example 2

110 grams of deionized water, 91 grams of an ethylene/vinyl acetate/acrylate terpolymer ("AIRFLEX 600 BP"), 25 grams of poplar fibers (Poplar Industrial Fiber, commercially available from Conwed Fibers), 25 grams of ethylene diamine phosphate (commercially available as "AMGARD NK" from Albright and Wilson Americas, Inc.), and 50 grams of a granular hydrated alkali metal silicate intumescent composition (commercially available under the trade designation "EXPANTROL 4BW" from Minnesota Mining and Manufacturing Company (3M) of St. Paul, Minn.) were placed in the bowl of the mixer and mixed at low speed (speed #1) for about 10 minutes until thoroughly blended. The mixer speed was increased (to speed #3) for about 5 minutes to incorporate air into the mixture. About 100 grams of the mixture was placed between two sheets of silicone-coated release liner (about 30.5 cm (12 inches) square) and pressed to 1.9 cm thickness on a small platen press. The resultant sheet was dried for about 18 hours in an 80° C. oven. Two samples were prepared in this manner.

The thickness of the dried samples were 1.23 cm and 1.46 cm.

The expansion ratio was determined for two samples and resulted in an average value of 1.13.

Example 3

This example was prepared as described in Example 2 and used the same ingredient amounts, except that 25 grams of intercalated graphite ("GRAFGUARD", Grade 338) were used as the intumescent material instead of 50 grams of granular hydrated alkali metal silicate.

The mixing time at high speed (speed #3) was 8 minutes, rather than 5. The foam-like mixture was poured into a mold (a three sided aluminum frame (20.3 cm square) to 1.9 cm thick) lined on the bottom with a silicone-coated paper release liner. The frame was left in place and the mixture dried overnight at 80° C. The dried material was cooled and removed from the frame. The resultant flexible, compressible pad had a thickness of 1.6 cm, a density according to the Dry Density Test of 0.12 grams/cm$^3$, based on the average of two samples, and an expansion ratio of 1.39.

Example 4

This example was prepared as described in Example 3 and used the same components and amounts, except that 50 grams of intercalated graphite ("GRAFGUARD", Grade 338) were used instead of 25 grams. Mixing, casting, and drying were carried out as described in Example 3. The resultant fire barrier pad had a thickness of 1.6 cm, a density, according to the Dry Density Test, of 0.17 grams/cm$^3$, and an expansion ratio of 2.41.

The pad was tested as described for the "Hose Stream Test" above. A piece of the fire barrier material (30.5 cm (12 in) long×5 cm (2 in) wide) was compressed to 67 percent of its starting thickness and placed at a 5 cm (2 inch) depth in the annular space around the copper pipe. The fire barrier material received a one-hour "F" Rating.

Example 5

This example used the same components and amounts as described in Example 1, except that no moist sponge crumb was added to the formulation. Mixing, casting, and drying were carried out as described in Example 1. The resultant fire barrier pad had a thickness of 2.05 cm, a density, according to the Dry Density Test, of 0.21 grams/cm$^3$, and an expansion ratio of 2.27.

A sample was tested according to the Compressibility and Thickness Recovery Test. The compression pressure was 39.5 KPa (5.7 psi) and the 90% recovery time was less than 30 seconds.

Example 6

220 grams of deionized water, 364 grams of an ethylene/vinyl acetate/acrylate terpolymer (55% solids, commercially available under the trade designation "AIRFLEX 600 BP" from Air Products and Chemicals, Inc. of Allentown, Pa.), 50 grams of pine fibers (Pinemat Fiber, commercially available from Conwed Fibers of Conover, N.C.), 25 grams of ethylene diamine phosphate (commercially available as "AMGARD NK" from Albright and Wilson Americas, Inc. of Richmond, Va.), 200 grams of a granular hydrated alkali metal silicate intumescent composition (commercially available under the trade designation "EXPANTROL 4BW" from Minnesota Mining and Manufacturing Company (3M) of St. Paul, Minn.), 50 grams of moist sponge crumb (i.e., ground-up sponge, having an average size of about 0.6 cm) (having a dry weight of 26.4 grams, commercially available under the trade designation "O-CEL-O" from Minnesota Mining and Manufacturing Company (3M) of St. Paul, Minn.), 12 grams of N-tallow sulfo succinimate surfactant, (33% solids, commercially available under the trade designation "STANFAX 318" from Standard Adhesive & Chemical Company, Inc. of Dalton, Ga.) and 24 grams of ammonium stearate surfactant (33% solids, commercially available under the trade designation "STANFAX 320" from Standard Adhesive & Chemical Company, Inc. of Dalton, Ga.), 11.11 grams of an acid-containing acrylic emulsion copolymer (18% solids, commercially available under the trade designation "ACRYSOL ASE-95 NP" from Rohm and Haas of Philadelphia Pa.), 100 grams of hydrated zinc borate ( commercially available under the trade designation "Firebrake ZB" from U.S. Borax of Los Angeles, Calif.) and 10.5 grams of sodium hydroxide aqueous solution (50% solids) were placed into the bowl of a 3-speed, 3.78 liter (1 gallon), planetary blade mixer (commercially available as Model N-50 from Hobart Corp. of Troy, Ohio). Mixing, casting, and drying were carried out as in Example 1.

The resultant fire barrier pad had a thickness of 3.40 cm, a density, according to the Dry Density Test, of 0.15 grams/cm$^3$, and an expansion ratio of 1.02.

A sample was tested according to the Compressibility and Thickness Recovery Test. The compression pressure was 70.3 KPa (10.2 psi) and the 90% recovery time was 60 seconds.

Example 7

This example was prepared as described in Example 6 and used the same components and amounts, except that 100 grams of granular hydrated alkali metal silicate ("EXPANTROL 4BW") were used instead of 200 grams and, in addition, 100 grams of intercalated graphite ("GRAFGUARD", Grade 338) were added. Mixing, casting, and drying were carried out as described in Example 1.

The resultant fire barrier pad had a thickness of 2.45 cm, a density, according to the Dry Density Test, of 0.29 grams/cm$^3$, and an expansion ratio of 2.45.

A sample was tested according to the Compressibility and Thickness Recovery Test. The compression pressure was 308. KPa (44.7 psi) and the 90% recovery time was 120 seconds.

Example 8

220 grams of deionized water, 364 grams of an ethylene/vinyl acetate/acrylate terpolymer (55% solids, commercially available under the trade designation "AIRFLEX 600 BP" from Air Products and Chemicals, Inc. of Allentown, Pa.), 26 grams of pine fibers (Pinemat Fiber, commercially available from Conwed Fibers of Conover, N.C.), 25 grams of ethylene diamine phosphate (commercially available under the trade designation "AMGARD NK" from Albright and Wilson Americas, Inc. of Richmond, Va.), 100 grams of intercalated graphite (commercially available under the trade designation "GRAFGUARD", Grade 338, from UCAR Carbon of Cleveland, Ohio), 111.5 grams of moist sponge crumb (i.e., ground-up sponge, having an average size of about 0.6 cm) (having a dry weight of 26.4 grams, commercially available under the trade designation "O-CEL-O" from Minnesota Mining and Manufacturing Company (3M) of St. Paul, Minn.), 12 grams of N-tallow sulfo succinimate surfactant, (33% solids, commercially available under the trade designation "STANFAX 318" from Standard Adhesive & Chemical Company, Inc. of Dalton, Ga.) and 24 grams of ammonium stearate surfactant (33% solids, commercially available under the trade designation "STANFAX 320" from Standard Adhesive & Chemical Company, Inc. of Dalton, Ga.), 11.11 grams of an acid-containing acrylic emulsion copolymer (18% solids, commercially available under the trade designation "ACRYSOL ASE-95 NP" from Rohm and Haas of Philadelphia Pa.), and 10.5 grams of sodium hydroxide aqueous solution (50% solids) were placed into the bowl of a 3-speed, 3.78 liter (1 gallon), planetary blade mixer (commercially available as Model N-50 from Hobart Corp. of Troy, Ohio). Mixing, casting, and drying were carried out as in Example 1.

The resultant fire barrier pad had a thickness of 2.85 cm, a density, according to the Dry Density Test, of 0.094 grams/cm$^3$, and an expansion ratio of 0.98.

A sample was tested according to the Compressibility and Thickness Recovery Test. The compression pressure was 35.5 KPa (5.2 psi) and the 90% recovery time was 120 seconds.

Comparative Example A

This example used the same ingredient amounts as described in Example 4. The ingredients were placed in the bowl of the mixer and mixed at low speed (speed #1) for 10 minutes until thoroughly blended. No further mixing was carried out and little, if any, air was incorporated into the mixture. The wet density of this mixture was 0.69 grams/ cm³. The mixture was poured into a mold (a three sided aluminum frame (20.3 cm square) to 1.9 cm thick) lined on the bottom with a silicone-coated paper release liner. The frame was left in place and the mixture dried overnight at 80° C. The dried material was cooled and removed from the frame. The thickness of the pad was 1.75 cm and had a density, according to the Dry Density Test, of 0.40 grams/cm³, based on the average of two samples.

Comparative Example B

A mat available under the trade designation "INTERAM I-10A" from Minnesota Mining and Manufacturing Company (3M) of St. Paul, Minn. was used for this example and is characterized by the manufacturer as an intumescent ceramic fiber blanket. The density of the material as listed in the product literature ranged from 617 kg/m³ to 714 kg/m³ (0.61 to 0.71 grams/cm³).

Comparative Example C

A mat available under the trade designation "INTERAM E-5" from Minnesota Mining and Manufacturing Company (3M) was used for this example and is characterized by the manufacturer as an endothermic ceramic fiber blanket. The density of the material as listed in the product literature was 865 kg/m³ (0.86 grams/cm³).

Comparative Example D

A mat available under the trade designation "INTERAM G-Mat" from Minnesota Mining and Manufacturing Company (3M) was used for this example and is characterized by the manufacturer as a graphite-based, flexible intumescent mat. The density of several samples of this product was measured and averaged 0.85 grams/cm³.

Although the preferred embodiments of the invention have been discussed and described in detail, it will be appreciated that changes and modifications to the described embodiments can be made by those skilled in the art without departing from the true spirit and scope of the invention, as set forth in the claims.

What is claimed is:

1. A fire barrier material comprising
   at least about 25 weight % binder;
   at least about 10 weight % intumescent compound; and
   at least about 5 weight % organic fibers comprising an organic material having pendant hydroxyl groups, based on a total dry weight of the fire barrier material; wherein the density of the fire barrier material ranges from greater than zero to about 0.35 grams/cm³.

2. The fire barrier material of claim 1 wherein the binder is selected from the group of acrylate polymers, natural rubbers, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, polychloroprene, ethylene/vinyl acetate/acrylate terpolymer, a vinyl acetate/dioctyl maleate copolymer and combinations thereof.

3. The fire barrier material of claim 1 wherein the binder is polychloroprene.

4. The fire barrier material of claim 1 wherein the binder is ethylene/vinyl acetate/acrylate terpolymer or a vinyl acetate/dioctyl maleate copolymer.

5. The fire barrier material of claim 1 further comprising flame retardant.

6. The fire barrier material of claim 5 wherein the flame retardant is selected from the group of ethylene diamine phosphate, magnesium ammonium phosphate, polymer-encapsulated ammonium polyphosphate, and organic phosphate oils, glass frit, boron-containing compounds, alumina trihydrate, and antimony oxide.

7. The fire barrier material of claim 1 wherein the fibers comprise cellulosic fibers.

8. The fire barrier material of claim 1 wherein the fibers comprise wood fibers.

9. The fire barrier material of claim 1 wherein the intumescent compound is selected from the group of intercalated graphite and hydrated alkali metal silicates.

10. The fire barrier material of claim 1 further comprising sponge.

11. The fire barrier material of claim 1 wherein the density ranges from about 0.1 to about 0.3 grams/cm³.

12. A fire barrier material comprising
    about 25–80 weight % binder;
    about 10–60 weight % intumescent compound; and
    about 5–60 weight % organic fibers comprising an organic material having pendant hydroxyl groups, based on a total dry weight of the fire barrier material; wherein the density of the fire barrier material ranges from greater than zero to about 0.35 grams/cm³.

13. The fire barrier material of claim 12 further comprising flame retardant.

14. The fire barrier material of claim 12 wherein the density ranges from about 0.1 to about 0.3 grams/cm³.

15. A method of making a fire barrier material comprising:
    (a) providing components comprising at least about 25 weight % binder, at least about 10 weight % intumescent compound, at least about 5 weight % organic fibers comprising an organic material having pendant hydroxyl groups, based on a total dry weight of the fire barrier material;
    (b) combining the components to form a mixture;
    (c) foaming the mixture;
    (d) placing the foamed mixture onto a substrate; and
    (e) drying the foamed mixture for a time sufficient to form the fire barrier material, wherein the fire barrier material has a density ranging from greater than zero to about 0.35 g/cm³.

16. The method of claim 15 further comprising a flame retardant.

17. The method of claim 15 wherein the flame retardant is selected from the group of ethylene diamine phosphate, magnesium ammonium phosphate, polymer-encapsulated ammonium polyphosphate, and organic phosphate oils, glass frit, boron-containing compounds, alumina trihydrate, and antimony oxide.

18. The method of claim 15 wherein the mixture further comprises cellulose sponge.

19. The method of claim 15 wherein the density ranges from about 0.1 to about 0.3 g/cm³.

20. The method of claim 15 wherein the foaming is accomplished by incorporating a gas comprising air.

21. The method of claim 15 wherein the substrate comprises a release liner.

22. The method of claim 15 wherein the binder is selected from the group of acrylate polymers, natural rubbers, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, polychloroprene, ethylene/vinyl acetate/acrylate terpolymer, a vinyl acetate/dioctyl maleate copolymer and combinations thereof.

23. The method of claim 15 wherein the binder is polychloroprene.

24. The method of claim 15 wherein the binder is ethylene/vinyl acetate/acrylate terpolymer or a vinyl acetate/dioctyl maleate copolymer.

25. The method of claim 15 wherein the fibers comprise cellulosic fibers.

26. The method of claim 15 wherein the fibers comprise wood fibers.

27. The method of claim 15 wherein the intumescent compound is selected from the group of intercalated graphite and hydrated alkali metal silicates.

28. A low density foam-like fire barrier material comprising at least about 25 weight % binder;

at least about 10 weight % intumescent compound; and at least about 5 weight % organic fibers comprising an organic material having pendant hydroxyl groups, based on a total dry weight of the foam-like fire barrier material; wherein the density of the foam-like fire barrier material ranges from greater than zero to about 0.35 grams/cm$^3$.

29. A low density foam fire barrier material comprising at least about 25 weight % binder;

at least about 10 weight % intumescent compound; and at least about 5 weight % organic fibers comprising an organic material having pendant hydroxyl groups, based on a total dry weight of the foam fire barrier material; wherein the density of the foam fire barrier material ranges from greater than zero to about 0.35 grams/cm$^3$ formed by the method comprising the steps of (a) providing components comprising at least about 25 weight % binder, at least about 10 weight % intumescent compound, at least about 5 weight % organic fibers comprising an organic material having pendant hydroxyl groups, based on a total dry weight of the fire barrier material;

(b) combining the components to form a mixture;

(c) foaming the mixture;

(d) placing the foamed mixture onto a substrate; and (e) drying the foamed mixture for a time sufficient to form the fire barrier material.

* * * * *

UNITED STATES PATENT AND TRADEMARK OFFICE
CERTIFICATE OF CORRECTION

PATENT NO. : 6,153,668
DATED : November 28, 2000
INVENTOR(S) : Robert E. Gestner and D. Max Harsbarger It is certified that error appears in the above-identified patent and that said Letters Patent is hereby corrected as shown below:

Column 3,
Line 2, "may referred" should read -- may be referred --;
Line 66, "crosslining" should read -- crosslinking --.

Column 4,
Line 3, "polymers" should read -- polymer --;
Line 65, "retardants" should read -- retardant --.

Column 5,
Line 11, delete "commercially available" 1st instance.

Column 6,
Line 46, "binder, oxide" should read -- binder, zinc oxide --

UNITED STATES PATENT AND TRADEMARK OFFICE
CERTIFICATE OF CORRECTION

PATENT NO. : 6,153,668
DATED : November 28, 2000
INVENTOR(S) : Robert E. Gestner and D. Max Harsbarger It is certified that error appears in the above-identified patent and that said Letters Patent is hereby corrected as shown below:

Column 7,
Line 4, "nd" should read -- and --;
Line 30, "sponges" should read -- sponge --.

Signed and Sealed this

Seventh Day of August, 2001

Attest:

NICHOLAS P. GODICI
Attesting Officer  Acting Director of the United States Patent and Trademark Office